United States Patent
Rakieski

[11] Patent Number: 6,129,391
[45] Date of Patent: Oct. 10, 2000

[54] PLASTIC COUPLING FOR PLASTIC PIPE HAVING A COMPLETED INSTALLATION SIGNAL

[75] Inventor: Kenneth E. Rakieski, Gifford, Pa.

[73] Assignee: Dresser Industries, Inc., Dallas, Tex.

[21] Appl. No.: 09/136,876

[22] Filed: Aug. 19, 1998

[51] Int. Cl.⁷ .................................................. F16L 17/06
[52] U.S. Cl. ........................ 285/93; 285/342; 285/372; 285/421; 285/337
[58] Field of Search ............................. 285/93, 337, 372, 285/374, 369, 342, 323, 921

[56] References Cited

U.S. PATENT DOCUMENTS

| | | | |
|---|---|---|---|
| 3,544,119 | 12/1970 | Glover | 277/206 |
| 3,853,338 | 12/1974 | Wilson | 285/337 |
| 4,372,586 | 2/1983 | Rosenberg et al. | 285/369 |
| 4,569,542 | 2/1986 | Anderson et al. | |
| 4,664,427 | 5/1987 | Johnston | 285/921 |
| 5,100,183 | 3/1992 | Montesi et al. | |
| 5,335,946 | 8/1994 | Dent et al. | 285/342 |

FOREIGN PATENT DOCUMENTS

| | | | |
|---|---|---|---|
| 1384638 | 11/1964 | France | 285/921 |
| 1675346 | 12/1970 | Germany | 285/369 |
| 2726035 | 12/1977 | Germany | 285/372 |
| 2807508 | 8/1979 | Germany | 285/921 |
| 4305609 | 11/1993 | Germany | 285/921 |
| 1223276 | 2/1971 | United Kingdom | 285/921 |

OTHER PUBLICATIONS

2" IPS Universal Maxi–Hold–B Coupling Systems, Inc. (Dates Unknown).

*Primary Examiner*—Eric K. Nicholson
*Attorney, Agent, or Firm*—Daniel Rubin

[57] ABSTRACT

A plastic pipe coupling for the joining of plain end plastic pipe that includes a pair of longitudinally displaced annular followers, a tubular middle ring extending between the opposite followers, an annular gasket within each follower contiguous to the middle ring, gripper segments within the follower that are operative during tightening installation of the follower about a received pipe end to effect a penetrating restraining grip against the surface of the pipe end and means on each of said followers cooperating with the end configuration of the middle ring to effect a snap-in-interlock and a perceptive signal when installation is completed.

8 Claims, 2 Drawing Sheets

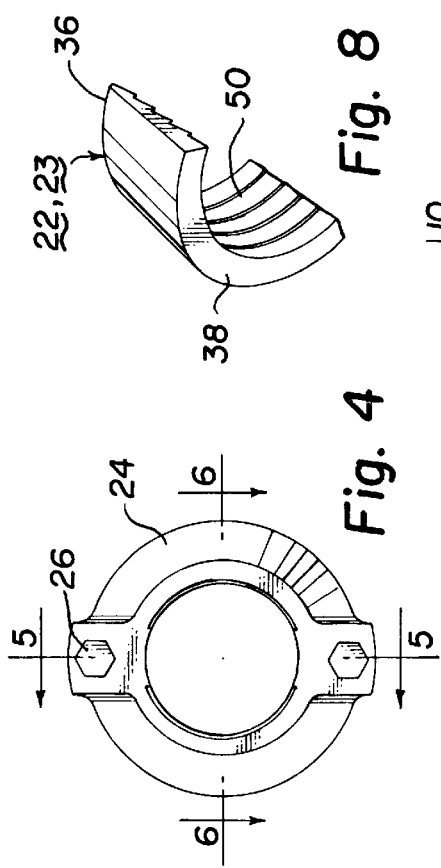

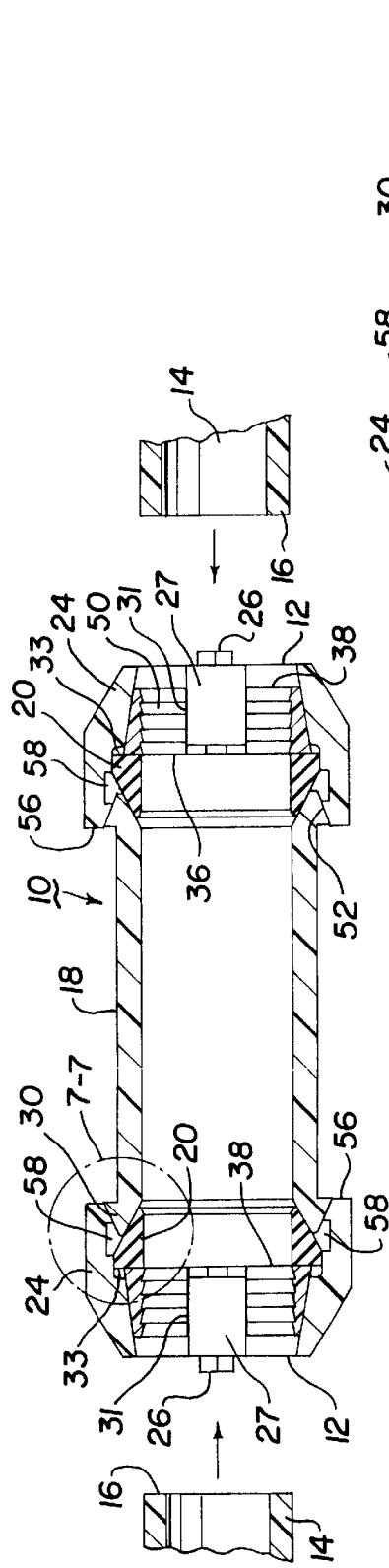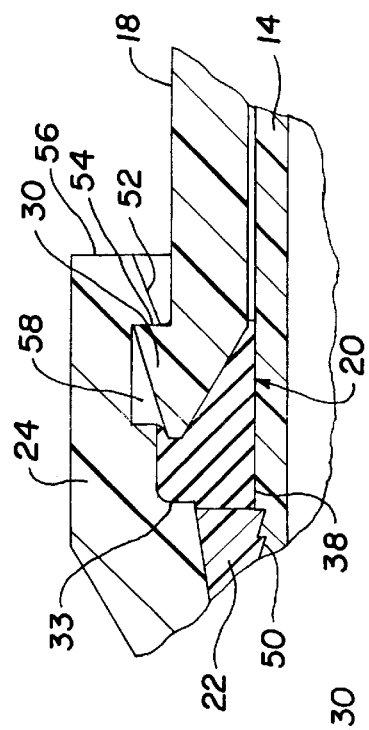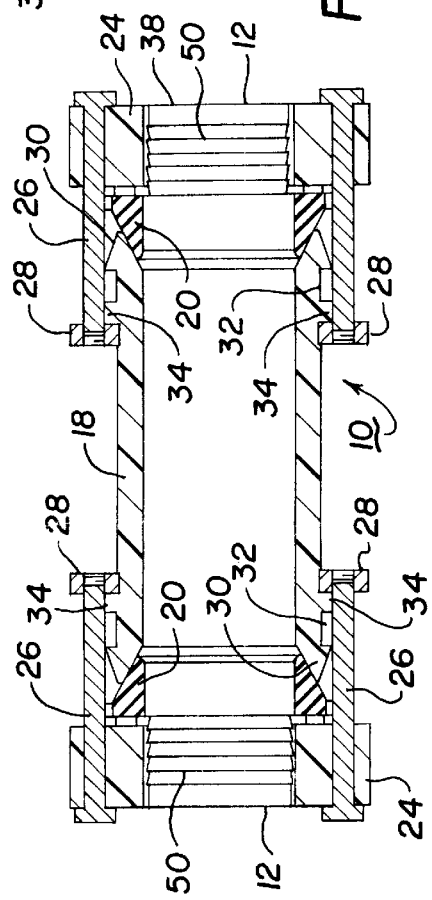

PLASTIC COUPLING FOR PLASTIC PIPE HAVING A COMPLETED INSTALLATION SIGNAL

FIELD OF THE INVENTION

The field of art to which the invention pertains includes the art of pipe joints and pipe couplings.

BACKGROUND OF THE INVENTION

Pipe couplings are commercially available from a variety of manufacturing sources and are used extensively for underground pipe installations as in the distribution of natural gas. Regardless of whether the coupling is intended for use on metal pipe or plastic pipe, such couplings have typically been constructed largely of metal components.

BACKGROUND OF THE PRIOR ART

Typical bolt type coupling constructions utilized in the prior art for natural gas service, are disclosed for example in U.S. Pat. Nos. 2,779,610, 4,569,542 and 5,100,183 and comprise a combination of a gasket to effect sealing and a lock ring to restrain the pipe against pull-out. Such couplings are generally of metal components and are operationally characterized by a grip imposed on the pipe by the lock ring. The ultimate grip normally occurs before or substantially simultaneous with attainment of the required gasket pressure for sealing. Metal couplings utilized for joining plastic pipe require isolation for corrosion protection and require monitoring.

A workman installing a coupling in some remote ditch may be unaware of the lack of gasket seal and which condition may not be recognized until long after the pipe line is completed and buried. Even a preliminary test may not reveal the condition since a partial but incomplete seal is known to appear adequate on initial test. It can be appreciated that where the line content is natural gas or the like, the potential explosion hazard represented by leaks can be horrendous.

While each of the foregoing coupling constructions have functioned well for their intended purposes, it has long been desired to receive a perceptive indication of when installation is in fact completed. It is likewise desirable to reduce fabrication costs of such couplings, particularly where intended for use on plastic pipe.

OBJECTS OF THE INVENTION

It is therefore an object of the invention to effect an improved pipe coupling construction fabricated of essentially all plastic components particularly adapted for use on plastic pipe.

It is a further object of the invention to effect the previous object with a coupling that provides a perceptive indication of when proper installation has been completed.

It is a still further object of the invention to effect the foregoing objects with a less costly construction as compared to prior constructions utilized therefor.

SUMMARY OF THE INVENTION

This invention relates to an improved pipe coupling of the bolted lock type for use on pipelines carrying high pressure combustible gas as to enable both a lock grip and gasket pressure to be achieved reliably in accordance with prescribed standards of installation. More specifically, the invention relates to such a pipe coupling of improved structure affording enhanced operability and lower fabrication costs compared to similar purpose couplings of the prior art.

The foregoing is achieved in accordance with the invention by a substantially all plastic coupling construction that does not rely on bolt force for sealing and restraining a plastic pipe being coupled. Included are a pair of oppositely located annular followers, a middle ring, a pair of non-plastic annular resilient gaskets and a restraining mechanism within each of the followers comprising a pair of gripper locking segments for effecting a restraining grip on received pipe during installation. The gripper segments are axially positioned within the follower at each end of the middle ring between the outer distal end of the follower and the gasket. The back face of the gasket is constructed having a smooth contour which when the gasket is uncompressed is positioned to afford a controlled axial clearance adjacent to a juxtaposed confronting face of the gripper segments thereat.

As metal draw bolts on the coupling are tightened in the process of installation, the coupling followers are drawn toward each other to force the individual gripper segments to gradually grasp the pipe wall while causing the gaskets to be compressed. The middle ring has a beveled offset at each end such that concomitantly with tightening of the bolts, the ends are gradually received in an internal recess of the respective follower. Ultimately, each end of the middle ring snaps into the recess, signaling to the installer that installation of the coupling is complete with an expected level of gripping restraint being imposed and gasket pressure having been achieved.

Being that all of the components, other than the gaskets, bolts and nuts are of a plastic composition, fabrication costs of the coupling are significantly reduced as compared to similar purpose couplings of metal components. At the same time, an inherent perceptive signal of installed completion, affords a virtue in the form of enhanced reliability not previously known.

The above noted features and advantages of the invention as well as other superior aspects thereof will be further appreciated by those skilled in the art upon reading the detailed description that follows in conjunction with the drawings.

BRIEF DESCRIPTION OF THE DRAWINGS

FIG. 1 is a fragmentary isometric front elevation of the coupling hereof;

FIG. 2 is a longitudinal isometric partially sectioned view of the coupling hereof;

FIG. 3 is a fragmentary enlargement of the encircled portion 3—3 of FIG. 2;

FIG. 4 is a front end elevation of the coupling hereof;

FIG. 5 is a longitudinal sectional view of the uninstalled coupling taken substantially along the lines 5—5 of FIG. 4;

FIG. 6 is a longitudinal sectional view of the uninstalled coupling taken substantially along the lines 6—6 of FIG. 4;

FIG. 7 is a fragmentary enlargement of encircled portion 7—7 of FIG. 6 in the installed relation of the coupling;

FIG. 8 is an isometric front view of a gripper segment hereof;

FIG. 9 is a side elevation view of the gripper segment of FIG. 8; and

FIG. 10 is an end view of the gripper segment as seen substantially from the position 10—10 of FIG. 9.

DESCRIPTION OF THE PREFERRED EMBODIMENT

In the description which follows, like parts are marked throughout the specification and drawings with the same reference numerals respectively. The drawing figures are not necessarily to scale and in certain views, parts may have been exaggerated for purposes of clarity.

Referring now to the drawings, there is illustrated a coupling 10 adapted to couple the opposing ends 16 of plastic pipes 14 (FIG. 6). Except as otherwise stated, all components of the coupling are comprised of a polymer plastic composition such as polyethylene, nylon or other suitable commercially available thermoplastics.

Comprising coupling 10 is a tubular middle ring 18 and an annular follower 24 at each end of the middle ring for receiving within each end 12 an annular elastomeric gasket 20. Axially juxtaposed behind the gasket are two radially separated gripper segments 22 and 23, for engaging a received pipe end 16 and impose a pull-out restraint thereagainst. The annular follower contains a plurality of longitudinal metal draw bolts 26 passing through boxed ears 27 and companion metal nuts 28. The interior underface of ears 27 defines opposite shoulders 31 providing arcuate separation between gripper segments 22 and 23. For reasons as will be understood, each follower 24 at its inward end includes chamfered face 52 and an undercut 33 in which to receive gasket 20. Each distal end 30 of middle ring 18 is comprised of a more or less wedge shape configuration 30 behind which is an undercut 32. A spaced lateral lug 34 on the middle ring receives draw bolt 26 and supports nut 28. Behind the inward end face 56 of follower 24, is an undercut 58 in which to receive and interlock with middle ring end 30 in the course of installation as will be explained.

The gripper segments 22 and 23 (FIGS. 8–10) are each comprised of a partially arcuate segment, tapered in an axial direction outwardly from rear face 36 to front face 38. About its inward surface each segment includes consecutive teeth 50 for gripping a received pipe end in the course of installation. The gripper segments are adapted to be received and supported in arcuate slots (not shown) within follower 24 extending between opposite box ears 27.

For installation, opposite pipe sections 14 (FIG. 6) are inserted inward of opposite coupling ends 12 until suitably received within middle ring 18. Thereafter, draw bolts 26 are tightened causing opposite followers 24 to advance over the middle ring toward each other. Advance is continued until the back surface 54 of middle ring end 30 wedges past chamfered follower edge 52 for distal ends 30 of the middle ring to snap into undercut 58 of the follower (see FIGS. 3 and 7) effecting an interlock against separation therebetween. Concomitantly therewith, gasket 20 is compressed between the front face 38 of gripper segments 22, 23, follower recess 33 and distal end 30 of the middle ring 18. Once compressed in this manner, the gasket forms an annular sealing relation about pipe section 14 therein. The snap-in interlock of end 30 into undercut 58 provides a perceptive signal to the installer, not only that the installation has been completed, but that required gasket force and the required level of pipe restraint by the gripper segments has been achieved.

Being that coupling 10 is of substantially all plastic composition, other than the elastomeric gasket 20, metal bolts 26 and nuts 28, a substantial cost reduction is achieved in the production of such couplings as compared to similar purpose couplings of the prior art. Whereas the coupling hereof has been described as not requiring bolts for other than assembly, bolts may be utilized for maintaining additional gasket pressure and gripper loading when required.

By the above description there is disclosed a novel pipe coupling affording virtues not found in similar purpose couplings of the prior art. Self interlocking of the follower and middle ring assures a threadless installation with the gasket adequately compressed and the gripper in a suitable gripping relation.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. A pipe coupling for joining plain end pipe and including:

a middle ring having at least one end and adapted to receive a pipe end to be coupled;

an annular elastometric gasket located at the end of said middle ring to be intervening between said end of said middle and a pipe end received in said middle ring;

a gripper unit located at the end of said middle ring axially juxtaposed to said gasket; and a follower at the end of said middle ring including a plurality of separate fastener elements which when tightened advance the follower for installation toward the middle ring to concomitantly cause said gripper unit to effect a restraining grip of a received pipe end while compressing said gasket into a sealing relation about the pipe end thereat;

each of said follower and said middle ring being cooperatively effective when said follower is advanced by said fastener elements to provide a perceptive signal of a completed installation of said coupling.

2. A pipe coupling in accordance with claim 1 in which said middle ring has opposite ends in which to receive opposite pipe ends to be coupled, there is included a follower at each end of said middle ring including fastener elements thereat and said perceptive signal is provided when the completed installation is provided at each end of said coupling.

3. A pipe coupling in accordance with claim 2 in which each of said followers and an opposite distal end of said middle ring are operable cooperatively to effect said signal by forming an axial interlock in the course of tightening by the fastener elements on said followers.

4. A pipe coupling in accordance with claim 3 in which each of said followers near its axially inward distal end includes an undercut about its internal surface and said middle ring includes an undercut near each of its distal ends and about its external surface for the distal end of said followers and the undercuts of middle ring to effect said interlock in a visually perceptive snap-in relation comprising said signal.

5. A pipe coupling in accordance with claim 2 in which said fastener elements comprise a plurality of draw bolts axially extending peripherally outward through said followers and said middle ring includes a plurality of arcuately spaced lugs laterally upstanding from the external periphery of said middle ring and against which to support a nut for cooperating with said draw bolts.

6. A pipe coupling in accordance with claim 5 in which at least said follower, said middle ring and said gripper unit are of a polymer plastic composition.

7. A pipe coupling in accordance with claim 6 in which said coupling is suitable for the joinder of plastic pipe.

8. A pipe coupling in accordance with claim 7 in which the maintained gasket pressure and restraining grip achieved by said gripper units on the received pipe are substantially independent of the tightened fastener force applied for installation.

\* \* \* \* \*